Feb. 8, 1927.
J. VOLZ
1,617,187
GRAIN CLEANER
Filed March 17, 1924    3 Sheets-Sheet 1

Fig.1.

J. VOLZ, Inventor

By C.A. Snow & Co.
Attorney

Feb. 8, 1927. 1,617,187
J. VOLZ
GRAIN CLEANER
Filed March 17, 1924    3 Sheets-Sheet 2

J. Volz, Inventor

By C.A.Snow&Co.
Attorney

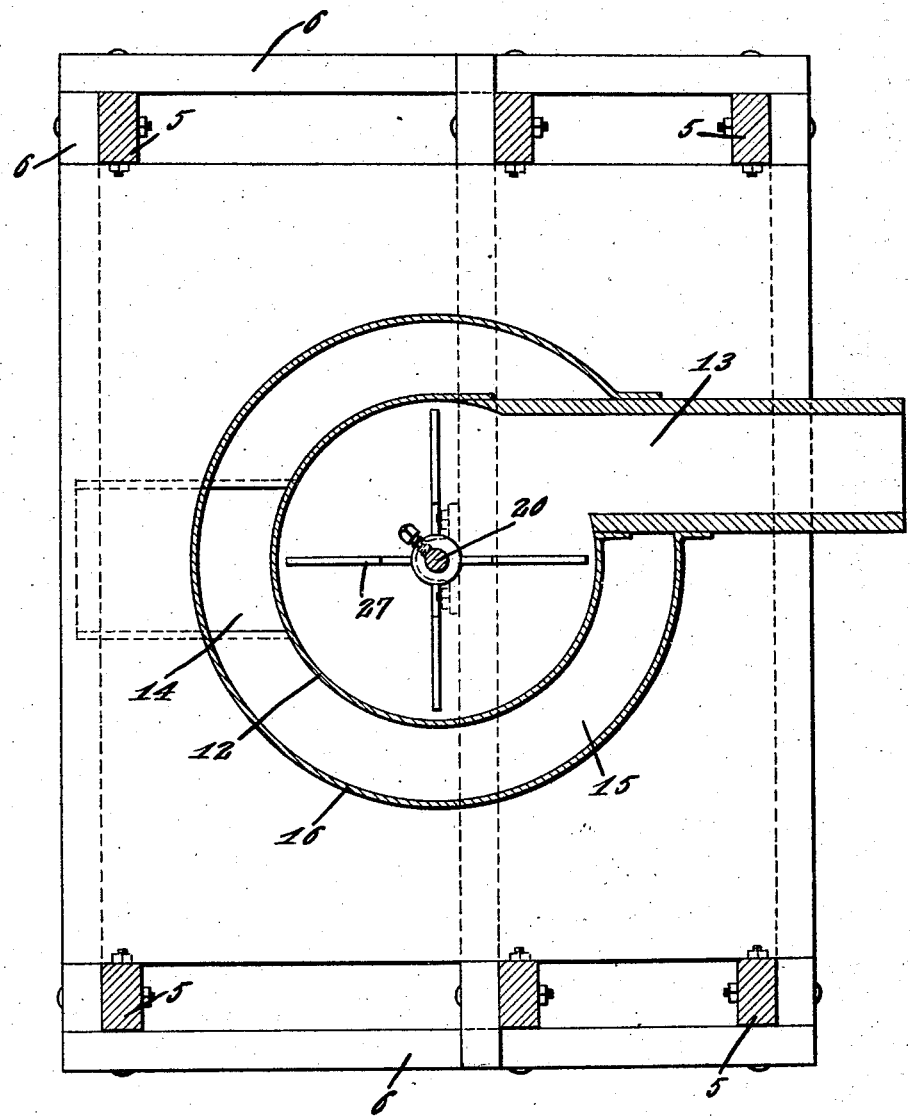

Patented Feb. 8, 1927.

1,617,187

UNITED STATES PATENT OFFICE.

JOSEPH VOLZ, OF ELLIOTT, NORTH DAKOTA.

GRAIN CLEANER.

Application filed March 17, 1924. Serial No. 699,867.

This invention has reference to a machine especially designed for scarifying, hulling and cleaning grain such as oats, sweet clover, alfalfa, clover, wheat, barley or the like and aims to provide novel means for separating the hulls and other foreign matter from the seed. It may also be used as a scourer for wheat and rye and as a smut machine. The smut kernels being broken and separated by draft without loss of grain.

An important object of the invention is to provide a seed engaging member of a novel construction, which will scarify and hull the seed on its passage through the machine, the construction of the machine being such as to cause the seed to pass through the machine by gravity.

Another object of the invention is the provision of means for creating a draft of air through the machine so that the hulls and other foreign matter may be separated by the air, the hulls being carried off by the draft to a place of deposit.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a machine constructed in accordance with the invention.

Figure 3 is a sectional view taken on line 3—3 of Figure 2.

Figure 2:
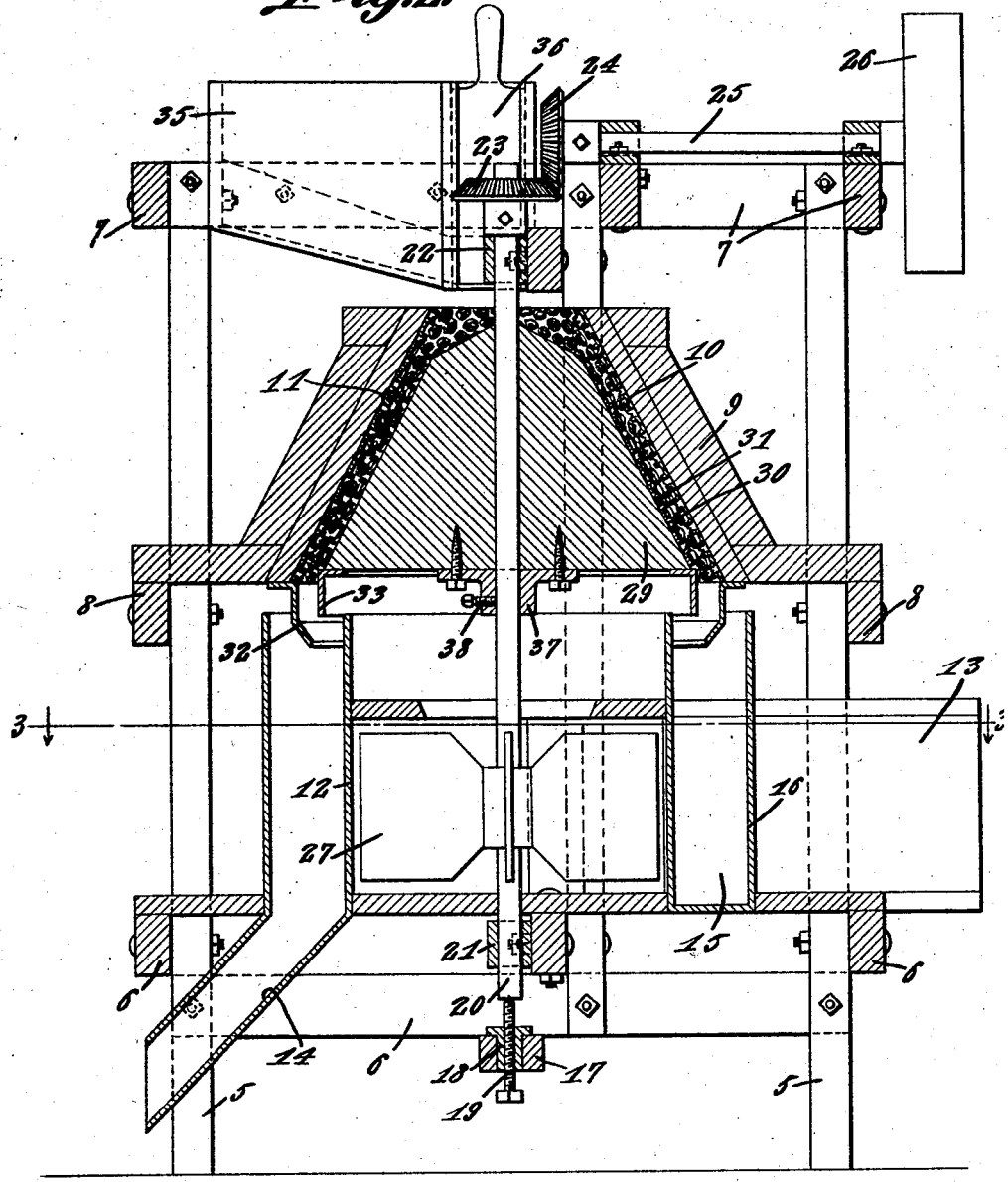
Figure 2 is a sectional view taken on line 2—2 of Figure 1.

Referring to the drawings in detail, the frame of the device includes supporting legs 5 which are connected adjacent to their lower ends by means of horizontal bars 6, bars 7 being provided at the upper ends of the legs 5 to hold the legs connected at their upper ends.

Intermediate bars 8 connect the leg members and provide supports for the member 9 through which the grain passes, the member 9 being in the form of an inverted bowl, the inner surface thereof being supplied with a seed engaging member 10 formed with a plurality of openings, the walls thereof extending inwardly as at 11 to provide scarifying surfaces.

Disposed under the member 9 is a circular fan housing 12 which communicates with the atmosphere at one side thereof, through the passageway 13, which constitutes the discharge opening for the hulls or other foreign matter drawn through the machine. At the opposite side of the machine is a chute 14 which communicates with the passageway 15 formed between the circular fan housing 12 and the casing 16 which is shown as supported in spaced relation therewith.

Connected with the bars 6 at opposite sides of the frame is a bar 17 formed with an opening to accommodate the threaded member 18 to which the adjustable bearing 19 moves, the adjustable bearing 19 having a tapered upper end fitted in a tapered recessed portion in the lower end of the shaft 20, whereby the weight of the shaft 20 may be properly supported.

The shaft 20 is also supported in bearings 21 and 22 and carries a beveled pinion 23 at its upper end that meshes with the pinion 24 secured to the inner end of the shaft 25 that receives motion through the pulley 26 and a suitable power device not shown.

Mounted on the shaft 20 is a fan 27 that operates in the fan housing 12, the upper wall 28 of the fan housing being formed with an opening whereby air may be drawn into the fan housing and forced through the discharge opening 13 thereof.

The reference character 29 indicates a rotating member which rotates by its connection with the shaft 20, and as shown this member 29 is substantially cone-shaped to fit within the member 9. The outer surface of the member 29 is covered with a metallic covering 30 formed with a plurality of openings 31, the walls thereof extending outwardly to cooperate with the inwardly extended walls 11 of the seed engaging member 10, it being understood that the member 29 is supported in such spaced relation with the seat engaging member 10 as to allow seed to pass therebetween without danger of mashing or crushing the seed.

Secured adjacent to the bottom of the member 9 and disposed between the fan housing 12 and casing 16 is a depending circular member 32 that extends inwardly to direct the seed inwardly towards the fan housing 12 after the seed has passed over the member 29. Cooperating with the member 32 is a ring member 33 which is spaced from the member 32 providing a passageway. The member 33 is also spaced from the upper end of the fan housing to allow air to be drawn into the fan housing and across the path of travel of the seed passing into the space between the fan housing and casing 16.

A hopper 35 is supported at the top of the frame and has an opening controlled by the sliding closure 36, the opening being arranged directly over the member 29 to direct grain thereto, where the grain may be hulled and cleaned. It might be further stated that the member 29 is secured to the shaft 20 by means of the collar which is supplied with a set screw 38 that has its inner end engaging shaft 20, so that by loosening the set screw, the member 29 may be adjusted longitudinally of the shaft 20 to vary the distance between the member 29 and seed engaging member 10, thereby adapting the device for use in connection with seed of various sizes.

In the operation of the device the member 29 is properly adjusted for the type of seed to be cleaned, and the seed allowed to fall from the hopper 35 onto the member 29. The member 29 is rotated in a manner as described, whereupon the cooperating sharp edges of the walls of the openings formed in the members 10, and the openings 31 of the covering member 30 will scarify the seed passing therebetween to the end that the hulls and other light material will be removed from the seed.

As the seed passes downwardly into the space between the fan housing 12 and casing 16, air passing into the fan housing will pick up the hulls and other light material and draw the same into the fan housing where it will be discharged through the passageway 13, the seed or heavier particles passing into the chute 14.

From the foregoing it is believed that a further detail description as to the operation of the device is believed unnecessary.

I claim:—

A grain cleaner including a frame, a fan housing supported at the base of the frame, and having an open upper end through which air may pass, an inverted bowl-shaped member supported above the upper end of the fan housing, a cone operating in the bowl, said bowl and cone-shaped member having cooperating roughened surfaces spaced apart to allow seed to pass therethrough, a flange carried at the base of the bowl, and having an inwardly extended portion, a flange carried at the base of the cone and providing a passageway with the first mentioned flange, said flanges being spaced from the upper end of the fan casing to allow air to pass thereunder, a vertical shaft adjustably supported within the frame and extending through the fan housing and bowl, a fan on the shaft and operating in the fan housing, means for adjustably supporting the cone, and means for operating the shaft to rotate the cone and fan to scarify seed passing over the cone, and said fan adapted to operate to blow foreign matter from the seed passing between the flanges.

In testimony that I claim the foregoing as my own, I have hereto affixed my signature.

JOSEPH VOLZ.